United States Patent [19]

Buehler et al.

[11] B 4,001,205

[45] Jan. 4, 1977

[54] WATER-SOLUBLE, FIBER-REACTIVE PHENYLAZODIHYDROXY, METHYL, CYANOPYRIDINE DYESTUFFS

[75] Inventors: Arthur Buehler, Rheinfelden; Alfred Fasciati, Bottmingen; Gerd Hoelzle, Liestal, all of Switzerland

[73] Assignee: Ciba-Geigy AG Basel, Switzerland

[22] Filed: Nov. 1, 1973

[21] Appl. No.: 411,624

[44] Published under the second Trial Voluntary Protest Program on March 16, 1976 as document No. B 411,624.

Related U.S. Application Data

[60] Division of Ser. No. 200,210, Nov. 18, 1971, abandoned, which is a continuation of Ser. No. 840,036, July 8, 1969, abandoned.

[30] Foreign Application Priority Data

July 15, 1968  Switzerland ............ 10521/68

[52] U.S. Cl. ............ 260/156; 260/146 R; 260/146 D; 260/146 T; 260/153; 260/154; 260/242; 260/249

[51] Int. Cl.$^2$ ............ C09B 62/08; C09B 62/24; C09B 62/50; D06P 3/58

[58] Field of Search .......... 260/145 D, 145 T, 153, 260/154, 156

[56] References Cited

UNITED STATES PATENTS

| | | | |
|---|---|---|---|
| 3,121,712 | 2/1964 | Berrie et al. | 260/146 T |
| 3,122,533 | 2/1964 | Senn | 260/207 |
| 3,123,595 | 3/1964 | Brugger et al. | 260/151 |
| 3,196,145 | 7/1965 | Reding et al. | 260/153 |
| 3,234,208 | 2/1966 | Liechti | 260/193 |
| 3,316,238 | 4/1967 | Hanke et al. | 260/146 R |
| 3,487,066 | 12/1969 | Ritter et al. | 260/156 |
| 3,619,112 | 11/1971 | Berrie et al. | 260/156 X |
| 3,642,427 | 2/1972 | Berrie et al. | 260/156 X |
| 3,642,765 | 2/1972 | Oesterlein et al. | 260/153 |
| 3,657,214 | 4/1972 | Berrie et al. | 260/156 |
| 3,664,996 | 5/1972 | Berrie et al. | 260/156 |
| 3,725,383 | 3/1973 | Austin et al. | 260/146 T |

*Primary Examiner*—Floyd D. Higel
*Attorney, Agent, or Firm*—Joseph G. Kolodny; Edward McC. Roberts; Prabodh I. Almaula

[57] ABSTRACT

Azo dyestuffs containing at least one acidic group imparting solubility in water and the grouping of the formula

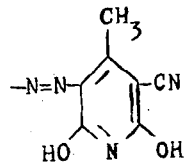

4 Claims, No Drawings

WATER-SOLUBLE, FIBER-REACTIVE PHENYLAZODIHYDROXY, METHYL, CYANOPYRIDINE DYESTUFFS

This is a divisional of application Ser. No. 200,210, filed on Nov. 18, 1971, now abandoned and which, in turn is a continuation of application Ser. No. 840,036, filed July 8, 1969 and now abandoned.

The present invention provides azo dyestuffs containing at least one acidic group imparting solubility in water and the grouping of the formula

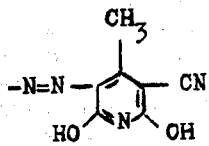

It provides, especially, dyestuffs of the kind defined that also contain a fibre-reactive grouping.

The groupings are, for example, $\alpha,\beta$-unsaturated acyl residues of aliphatic carboxylic acids, for example, the acrylic residue, the $\alpha$-bromoacrylic residue, the $\alpha$-chloroacrylic residue and the residues of the formula

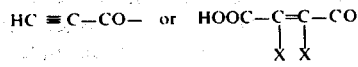

in which one of the two symbols X represents a hydrogen atom and the other a chlorine or a bromine atom, and preferably residues containing exchangeable substituents. The exchangeable substituent, that is to say, a substituent capable of reacting with fibrous material in the presence of an alkali, in residues of the kind mentioned can be bound to a heterocyclic residue containing two nitrogen atoms, for example, a pyrimidine residue, or to the acyl residue of an acid containing at least one acid group of the formula

for example, an acyl residue derived from cyanuric acid or barbituric acid or from an aliphatic or cycloaliphatic carboxylic acid. In the case of the acyl residue derived from cyanuric acid, the dyestuffs contain at least one halogen atom bound to a 1,3,5-triazine ring, for example, a dichlorotriazine residue or a monochlorotriazine residue, for example, those of the formula

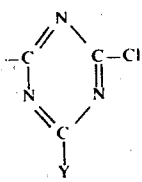

in which Y represents an amino group that may be further substituted or a substituted hydroxyl group or a thio group.

Dichloro- and trichloro- and bromo-pyrimidine residues and also pyrimidine residues having eliminable sulphonyl groups are examples of residues derived from barbituric acid. Acyl residues derived from aliphatic or cycloaliphatic carboxylic acids preferably contain one or more halogen atoms and only a few carbon atoms, for example, 2 to 5. Examples are the chloroacetyl residue, the $\alpha$- or $\beta$-chloropropionyl residue and especially the $\alpha,\beta$-dichlororo- or $\alpha,\beta$-dibromopropionyl residue, fluorocyclobutanecarboxylic acid residues, especially the tri- and tetrafluorocyclobutanecarboxylic acid residues, and the residues of the formulae

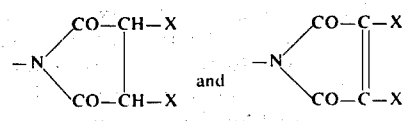

in which one of the symbols X represents a halogen atom, for example, a chlorine or a bromine atom, and the other represents a halogen or a hydrogen atom.

Dyestuffs that are specially valuable are those corresponding to the formula

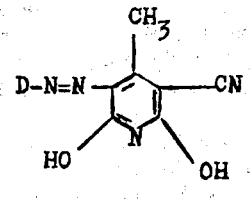

in which D represents the residue of a diazo component of the benzene or naphthalene series containing at least one acidic group and if desired an azo group, and also the heavy-metal compounds thereof. In addition to an acidic group, for example, a sulphato or a carboxyl group, and especially a sulphonic acid group, one or more further substituents may be present in the residue D, for example, alkoxy, hydroxy, acylamino, cyano, sulphonyl, sulphamide or nitro groups and/or halogen atoms and, advantageously, fibre-reactive substituents.

The present invention provides a process for preparing the dyestuffs of the present invention, which comprises coupling 2,6-dihydroxy-3-cyano-4-methylpyridine, for example, in an aqueous acidic, neutral or slightly alkaline medium, with a diazo compound of an aromatic or heterocyclic amine containing at least one acidic group. The following are given as examples of amines of the kind defined:- aminoazobenzenemonosulphonic or disulphonic acid, 1-aminobenzene-2-, -3- or -4-sulphonic acid, 1-aminobenzene-3- or -4-carboxylic acid, 1-aminobenzene-2,5-disulphonic acid, 4-amino-1-methoxybenzene-2-sulphonic acid, 2-amino-1-methoxybenzene-4-sulphonic acid, 3-amino-6-hydroxybenzoic acid-5-sulphonic acid, 5-acetylamino-2-aminobenzene-1-sulphonic acid, 4-acetylamino-2-aminobenzene-1-sulphonic acid, 1-amino-3-(2',4'-dichlorotriazinyl(6))-aminobenzene-4-sulphonic acid, 1-amino-3-(2'-chloro-4'-aminotriazinyl (6))-aminobenzene-4-sulphonic acid, chloro- or nitroaminobenzenesulphonic acid, 1-aminonaphthalene-4-, -5-, -6- or -7-sulphonic acid, 2-aminonaphthalene-4-, -6-, -7- or -8-sulphonic acid, 2-aminonaphthalene-1-sulphonic acid, 1-aminonaphthalene-3,6-disulphonic acid, 2-aminonaphthalene-1,5-disulphonic acid, 2-aminonaphthalene-3,6-, -4,8-, -5,7- or -6,8-disulphonic acid, 1- or 2-aminonaphthalenetrisulphonic acid, 1-(3'- or 4'-aminobenzoyl)-aminobenzene-3-sulphonic acid, 3-aminopyrene-8- or -10-monosulphonic acid, 3-aminopyrene-5,8- or -5,10-disulphonic acid, 4-nitro-4'-aminostilbene-2,2'-disulphonic acid, O-acyl derivatives of aminonaphtholsulphonic acids, for example, the O-acyl derivatives of 1-amino-8-hydroxynaphthalene-3,6- or -4,6-disulphonic acid, dehydrothiotoluidinesulphonic acid and especially amines which lead to the formation of metallizable dyestuffs, for example, 5-acetylamino- or benzoylamino-2-aminobenzene-1-carboxylic acid, 2-amino-benzoic acid-4- or -5-sulphonic acid, 6-chloro-, 6-nitro- or 6-acetylamino-2-aminophenol-4-sulphonic acid, 2-aminophenol-4-or -5-sulphonic acid, 3-amino-2-hydroxybenzoic acid-5-sulphonic acid, 2-aminophenol-4- or -5-sulphonic acid, 4-chloro- or 4-nitro-2-aminophenol-6-sulphonic acid, 1-amino-2-hydroxynaphthalene-4-sulphonic acid and 6-nitro-1-amino-2-hydroxynaphthalene-4-sulphonic acid, also 1-hydroxy-2-aminonaphthalene-4,8-disulphonic acid, 2,5-dimethoxy-4-amino-1,1'-azobenzene-3'-sulphonic acid, 2-aminophenole, 1,3-diaminobenzene-4-sulphonic acid, 1,4-diaminobenzene-5-sulphonic acid, 1,4-diamino-2-(4-methyl-3-sulphobenzenesulphonylbenzene), 4-(4-amino-2-sulphobenzeneazo)-1-amino-8-sulpho-naphthalene, 1-aminobenzene-3-sulphatoethylsulphone, 1-amino-3-sulphatoethyl-aminosulphonyl-benzene, 2-(2,4-diamino-5-sulphobenzeneazo)-4,8-disulphonaphthalene, 1,3-diaminobenzene-4,6-disulphonic acid, and 1,4-diaminobenzene-2,5-disulphonic acid.

When the amines, the diazo compounds of which are used in the manufacture of the dyestuffs of the invention, contain a grouping capable of metal-complex formation, for example, a carboxyl group, a hydroxyl group or an alkoxy group, for example, a methoxy group, in a position vicinal to the amino group, the dyestuffs obtained can be converted into heavy-metal complex compounds, for example, copper, chromium, nickel or cobalt complex compounds; if desired or required, this conversion can take place either before or after conversion into a fibre-reactive dyestuff.

Metallization may be effected, for example, with a salt, which contains the metal concerned in the form of a cation, for example, chromium sulphate, cobalt acetate, cobalt sulphate, copper sulphate and copper acetate. In some cases it is advantageous to use a complex metal compound, for example, in the form of a metal-amine complex, for example, a copperammine sulphate made from copper sulphate and ammonia, pyridine or monoethanolamine, or in the form of a compound which contains one of the metals mentioned bound in complex union in the anion, for example, a complex chromium compound of an organic hydroxycarboxylic acid, for example, salicylic acid, or complex cobalt or a copper compound of an alkali metal salt of aliphatic aminocarboxylic acids or hydroxycarboxylic acids, for example, of glycocoll, of lactic acid and especially of tartaric acid, for example, sodium copper tartrate.

The treatment with the metal donor can be carried out by a method known per se, for example, at room temperature or at a moderately elevated temperature when the dyestuffs are easily metallizable, or, when dealkylation has to take place at the same time as metallization, at a temperature within the range of from 50° to 120°C in an open vessel, for example, with reflux, or if necessary, in a closed vessel under superatmospheric pressure; the pH conditions are determined by the kind of metallization process adopted, for example, an acid coppering with copper sulphate or an alkaline coppering with copper tetraminesulphate. If desired, solvents, for example, alcohol and, dimethylformamide, can also be present in the metallization process.

The metal compounds obtained can contain one or two dyestuff molecules bound in complex union with one atom of metal. Copper and nickel are generally used to produce compounds containing one metal atom per molecule of dyestuff, whereas 1:2-metal complexes are easily obtained with chromium and especially cobalt, dyestuffs of this kind being specially valuable.

The dyestuffs of the invention and the heavy-metal compounds thereof containing an acylatable grouping, for example, an acylatable amino group, especially one of the formula $-NH-C_{n-1}H_{2n-1}$ (in which $n$ is an integer of not greater than 7) or a grouping convertible into an acylatable group (for example, a nitro group or an acylamino group) can be converted by condensation (acylation) into fibre-reactive dyestuffs, if necessary, after conversion of the grouping mentioned into an acylatable group.

The acylating agents used are anhydrides or halides of an acid, the acyl residue of which is capable of reacting with fibrous materials with formation of a chemical bond.

Examples of such anhydrides or halides of acids in which the acyl residue is reactive are the anhydrides and halides of aliphatic $\alpha,\beta$-unsaturated carboxylic acids, for example, chloromaleic anhydride, propiolic acid chloride and acrylic acid chloride and especially the halides of aliphatic carboxylic acids containing exchangeable halogen atoms, for example, chloroacetyl chloride, sulphochloroacetic acid chloride, $\beta$-bromo- or chloropropionic acid chloride, $\alpha,\beta$-dichloro- or -dibromopropionic acid chloride, fluorocyclobutanecarboxylic acid halides, for example, tri- and tetra-fluorocyclobutanecarboxylic acid chlorides, $\alpha$-chloro- or $\alpha$-bromo-acrylic acid chloride or bromide, and also heterocyclic acylating agents, for example, 2-halogenobenzthiazole- or -oxazolecarboxylic or -sulphonic acid chloride, 3,6-dichloropyridazine-5-carboxylic acid chloride, tetrachloropyridazine, 4,5-dichloropyridazon-(6)-yl-propionic acid chloride, 4,5-dichloro-1-phenylpyridazonecarboxylic or -sulphonic acid chloride, 4,5-dichloropyridazonepropionic acid chloride, 1,4-dichlorophthalazinecarboxylic or -sulphonic acid chloride, 2,3-dichloroquinoxalinecarboxylic or -sulphonic acid chloride, 2,4-dichloroquinazolinecarboxylic or -sulphonic acid chloride, 2,4,6-trichloro- or 2,4,6-tribromo-pyrimidine and the derivatives thereof which contain, for example, in 5-position a cyano, nitro, methyl, ethyl, carbamide, sulphamide, carbomethoxy, carbalkoxy, acyl (for example, benzoyl, acetyl or propionyl), alkenyl (for example, allyl or chlorovinyl) or a substituted alkyl (for example, carboxymethyl, chloromethyl or bromomethyl) group, 2,4,5,6-tetrachloro- or 2,4,5,6-tetrabromopyrimidine, 2,6-dichloro- or 2,6-dibromo-4-carboethoxypyrimidine, 2,4,5-trichloropyrimidine, 5-nitro-6-methyl-2,4-dichloropyrimidine, 2,4-dichloropyrimidine-6-carboxylic acid chloride, 2,4-dichloropyrimidine-5-carboxylic acid chloride, 2,6-dichloro- or 2,6-dibromopyrimidine-4- or -5-carboxylic acid or -sulphonic acid amides or -4- or -5-carboxylic acid or -sulphonic acid chloride, 2,4-dichloropyrimidine-5-sulphonic acid, 2,4-dichloro-5-chloromethyl-6-methylpyrimidine, 2,4-dibromo-5-bromomethyl-6-methylpyrimidine, 2,4-dichloro-5-chloromethylpyrimidine, 2,4-dibromo-5-bromomethylpyrimidine, 2,5,6- trichloro-4-methylpyrimidine, 2,6-dichloro-4-trichloromethylpyrimidine or especially 2-methanesulphonyl-4,5-dichloro-6-methylpyrimidine, 2,4-dimethanesuphonyl-5-chloro-6-methylpyrimidine, 2,4,6-trichloro-1,3,5-triazine or 2,4,6-tribromo-1,3,5-triazine and 4,6-dichloro-1,3,5-triazines substituted at 2-position by an aryl or alkyl residue, for example, a phenyl, methyl or ethyl residue, or by the residue of an aliphatic or aromatic mercapto or hydroxyl compound bound through the sulphur atom or oxygen atom respectively, or especially by an —NH$_2$ group or by the residue of an aliphatic, heteroaliphatic or aromatic amino compound bound through its nitrogen atom. The following are given as examples of such compounds whose residues can be bound in 2-position to the triazine nucleus by reaction with trihalogenotriazines: aliphatic or aromatic mercapto or hydroxyl compounds, for example, thioalcohols, thioglycollic acid, thiourea, thiophenols, methyl alcohol, ethyl alcohol, isopropyl alcohol, glycollic acid, phenol, chlorophenols, nitrophenols, phenolcarboxylic and phenolsulphonic acids, naphthols, naphtholsulphonic acids, and so forth, but especially ammonia and compounds containing acylatable amino groups, for example, hydroxylamine, hydrazine, phenylhydrazine, phenylhydrazinesulphonic acids, carbamic acid and the derivatives thereof, semi- and thiosemi-carbazides and -carbazones, methylamine, ethylamine, isopropylamine, methoxyethylamine, methoxypropylamine, dimethylamine, diethylamine, methylphenylamine, ethylphenylamine, chloroethylamine, ethanolamines, propanolamines, benzylamine, cyclohexylamine, morpholine, piperidine, piperazine, aminocarbonic acid ester, aminoethyl acetate, aminoethanesulphonic acid and N-methylaminoethanesulphonic acid, but especially aromatic amines, for example, aniline, N-methylaniline, toluidines, xylidines, chloroanilines, para- or meta-aminoacetanilide, nitroanilines, aminophenols, nitrotoluidines, phenylenediamines, toluylenediamines, anisidine, phenetidine, diphenylamine, naphthylamine, aminonaphthols, diaminonaphthalenes, and especially anilines containing acidic groups, for example, sulphanilic acid, metanilic acid, orthanilic acid, anilinedisulphonic acid, aminobenzylsulphonic acid, aniline, ω-methanesulphonic acid, aminodibenzoic acid, naphthylaminodi- and -trisulphonic acids, amonobenzoic acids, for example, 1- or 2-hydroxy-5-aminobenzoic acid, aminonaphtholmono-, -di- and -tri-sulphonic acids, aminobenzoic acid-sulphonic acid, and so forth; also coloured compounds or compounds having dyestuff characteristics, for example, 4-nitro-4'-aminostilbenedisulphonic acid and aminoazo dyestuffs or aminoanthraquinones or phthalocyanines that still contain at least one reactive amino group.

The introduction of a triazine residue substituted at 2-position by the residue of a hydroxyl, mercapto or amino compound or ammonia into a dyestuff of the invention can also advantageously be carried out by first reacting the dyestuff containing acylatable groups with a 2,4,6-trihalogeno-1,3,5-triazine, especially cyanuric chloride, and then replacing a halogen atom in the dihalogenotriazine residue or residues so obtained with one or more of the above-mentioned compounds.

Furthermore, a β-chloropropionyl, α,β-dichloro- or dibromopropionyl residue present in the dyestuffs prepared in the manner described above can subsequently be converted into an unsaturated acyl residue, for example, an acrylic residue or a chloroacrylic or bromoacrylic residue, in accordance with the invention by elimination of hydrogen halide by means of an agent having an alkaline reaction.

The new dyestuffs can also be converted into fibre-reactive dyestuffs in accordance with the invention by introducing the fibre-reactive grouping by condensation of the dyestuff, prepared by coupling, according to Einhorn-Tcherniak, with a methylol compound of an acid amide containing one or more fibre-reactive acyl residues, for example with a methylol derivative of the above-mentioned aliphatic or cycloaliphatic acids having fibre-reactive acyl residues.

The dyestuffs obtained in accordance with the process of the invention and the modifications thereof are of high tinctorial strength and are suitable for dyeing and printing a very wide variety of materials, for example, silk, wool and polyamide fibres and polyhydroxylated materials of fibrous structure, including both man-made fibres, for example, fibres made from regenerated cellulose viscose, and natural fibres, for example, linen and especially cotton. Many of the dyestuffs possess high affinity for the above-mentioned nitrogenous materials in a slightly acid to acid dyebath and also a high affinity for cellulosic fibres. The dyeings obtained, especially those on wool, are distinguished by good fastness to washing and milling.

The dyestuffs of the invention possess much better properties of fastness, especially better fastness to light and wet treatments, than the known dyestuffs of analogous composition which contain a dihydroxyquinoline residue instead of the 2,6-dihydroxy-3-cyano-4-methyl component. Of special importance is the fact that the new dyestuffs yield a much greener shade, which mades them of greater value than the above-mentioned known dihydroxyquinoline dyestuffs.

The new fibre-reactive dyestuffs are also suitable for dyeing cellulose by the pad-dyeing process in which the material is impregnated with a dyestuff solution, which may also contain salt, and the dyestuff is fixed on the fibre by a treatment with an alkali, preferably with the application of heat. This process yields dyeings which are generally distinguished by good fastness to light and especially by excellent fastness to wet treatments. They are however, specially suitable for direct dyeing by the exhaustion process in which dyeing is carried out in a high liquor-to-goods ratio, brilliant yellow shades being obtained.

Valuable and fast shades can also be obtained on cellulosic fibres by printing processes, the dyestuffs being fixed on the fibre by a heat treatment in the presence of an alkali.

Any unfixed dyestuff should be removed as completely as possible after dyeing or printing. To this end, the dyed or printed material is thoroughly rinsed with warm and cold water and then soaped in the presence of a non-ionic dispersing and/or wetting agent.

The following Examples illustrate the invention, the parts and percentages being by weight, unless otherwise stated.

EXAMPLE 1

20 Parts of a monoazo dyestuff prepared in the usual manner by alkaline coupling of 12.5 parts of diazotized 1-amino-2-hydroxynaphthalene-4-sulphonic acid with 7.9 parts of 4-methyl-2,6-dihydroxy-3-cyanopyridine are boiled for 6 hours in 500 parts of water and 68.25 parts by volume of chromiumsalicyclic acid solution containing 1.3 parts of chromium, the 1:2-chromiumcomplex dyestuff thus formed is precipitated by the addition of sodium chloride, isolated by filtration and dried. It is a violet powder producing a violet solution in water and a claret solution in sulphuric acid which dyes wool a violet shade of good fastness in a slightly acid bath in the presence of a levelling agent.

Dyestuffs having similar properties which dye wool the shades listed in Column III of the following Table may be obtained by using the metal complexes obtained from the diazo compounds of the amines listed in Column I when they are treated with one of the metal donors indicated in Column II.

The non-metallized disazo dyestuff of the formula

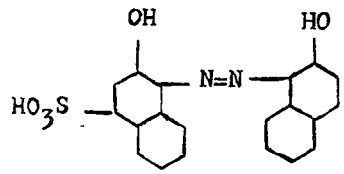

obtained in accordance with Example 1 by diazotization of 4-amino-3,6-dimethoxyazobenzene-3'-sulphonic acid and coupling with 2,6-dihyroxy-3-cyano-4-methylpyridine dyes wool a claret shade which is fast to light and wet treatments.

EXAMPLE 2

When the chromium salicylate as used in Example 1 is replaced as metal donor by a corresponding amount of the 1:1-chromium-complex compound of the monoazo dyestuff of the formula

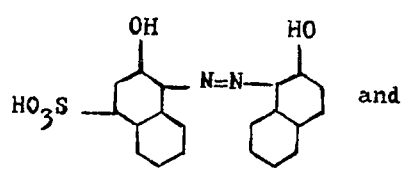

metallization produces the 1:2-chromium-complex compound of the dyestuffs

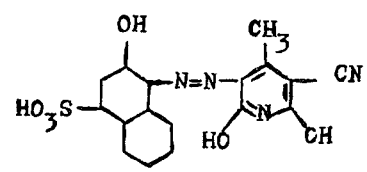 and

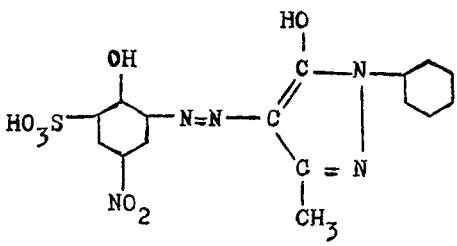

In the dry state it is a dark powder producing a bluish violet solution in water and a blue solution in concentrated sulphuric acid. It dyes wool a navy blue shade of good fastness when applied in a bath acidified with acetic acid and, if necessary, in the presence of a levelling agent.

The chromium mixed-complex compound of the monoazo dyestuffs of the formulae and

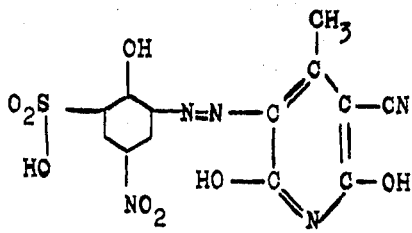

produced in an analogous manner dyes wool a golden orange shade possessing good fastness to light and wet treatments.

The 1:2chromium complex dyestuff obtained in the same manner from the 1:1-chromium complex compound of the monoazo dyestuff of the formula

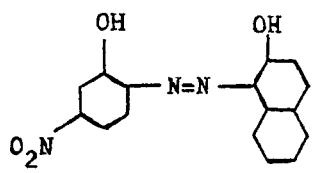

and the monoazo dyestuff of the formula

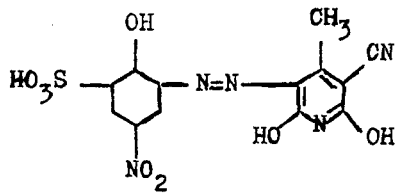

dyes wool a brownish violet shade of good fastness.

The 1:2-chromium complex dyestuff obtained from the 1:1-chromium complex compound of the monoazo dyestuff of the formula

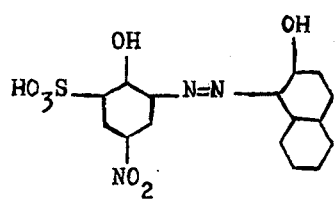

and the monoazo dyestuff of the formula

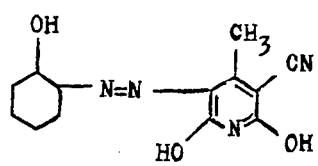

also dyes wool a brownish violet shade.

EXAMPLE 3

12.3 Parts of 6-acetamino-2-aminophenol-4-sulphonic acid are diazotized in the usual manner and coupled with 7.9 parts of 4-methyl-2,6-dihydroxy-3-cyanopyridine in a medium rendered slightly acid to Congo paper, and the acetylamino group is then hydrolysed in 10% hydrochloric acid. The dyestuff obtained thereby is metallized in a slightly acid pH with a chromium acetate solution containing 1.3 parts of chromium, precipitated, and then acylated by a method known per se at 20° to 25°C with 15 parts of α,β-dibromopropionyl chloride in the presence of 10 parts of sodium bicarbonate. The dyestuff is precipitated out of the solution by the addition of sodium chloride, isolated by filtration and dried. It is a red powder producing a red solution in water and an orange solution in sulphuric acid. It dyes wool a red shade of good fastness when applied in a slightly acid bath in the presence of a levelling agent.

When the monoazo dyestuff of the formula

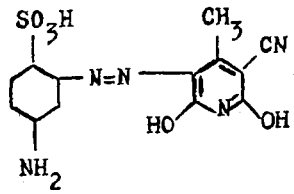

is manufactured in a manner analogous to that described in Example 3 and reacted with 4,6-dichloro-2-(3-sulphophenylamino)-1,3,5-triazine, a dyestuff of the formula

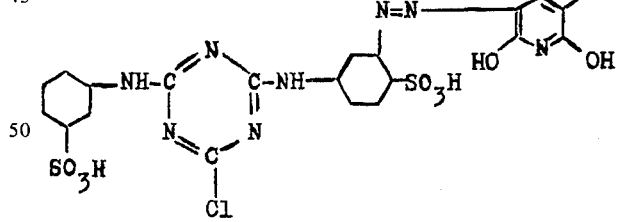

is obtained that dyes cotton a yellow shade having good properties of fastness.

EXAMPLE 4

20.15 parts of 1-amino-3-(α,β-dibromopropionylamino)benzene-6-sulphonic acid are suspended in 580 parts by volume of water, 44 parts by volume of α-naphthalenesulphonic acid solution are added and diazotization is carried out at 0° to 5°C with 12.5 parts by volume of 4N sodium nitrite solution. The diazo solution so obtained is rendered Congo acid (violet) with 30 parts by volume of a 15% sodium carbonate solution and then stirred into a solution of 7.9 parts of 4-methyl-2,6-dihydroxy-3-cyanopyridine in 150 parts of water. After coupling, the dyestuff, which precipitates completely, is isolated by filtration and dried. It is a yellow powder producing an orange solution in water and a yellow solution in sulphuric acid. It dyes wool a yellow shade possessing good properties of fastness when applied in a slightly acid bath, if necessary, in the presence of a levelling agent.

Dyestuffs having similar properties may be obtained from the diazo compounds of the amines listed in Column I of the following Table; the shades produced on wool are indicated in Column II.

| | I | II |
|---|---|---|
| 1 | [structure: cyclohexane ring with SO₃H, NH₂, and NH-CO-C(Br)=CH₂ substituents] | yellow |
| 2 | [structure: cyclohexane ring with SO₃H, NH₂, and NH-CO-CH(Br)-CH₂-Br substituents] | orange |
| 3 | [structure: two sulfonated cyclohexane rings linked via NH groups to a chloro-triazine; one ring also bears NH₂] | yellow |
| 4 | [structure: cyclohexane ring with NH₂ and HN-CO-CH(Br)-CH₂-Br, linked via SO₂ to a second cyclohexane ring bearing SO₃H and CH₃] | orange |
| 5 | [structure: cyclohexane ring with HN-CO-CH(Br)-CH₂Br group, linked via N=N to a decalin bearing NH₂ and SO₃H, with SO₃H on first ring] | brown |

-continued
| | I | II |
|---|---|---|
| 6 | 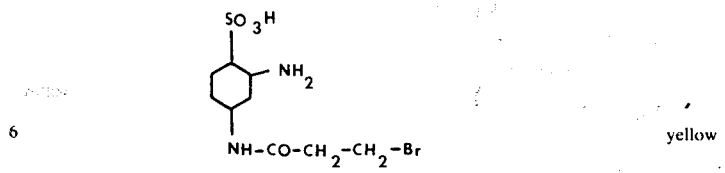 | yellow |
| 7 | 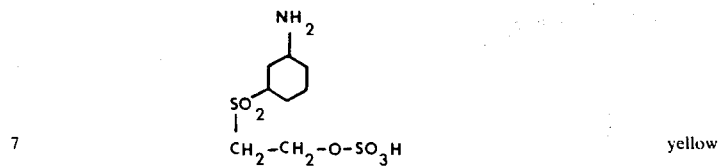 | yellow |
| 8 | 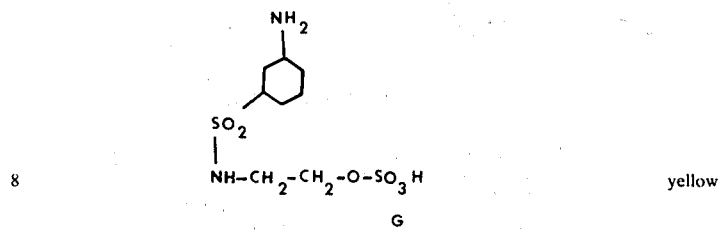 G | yellow |
| 9 | 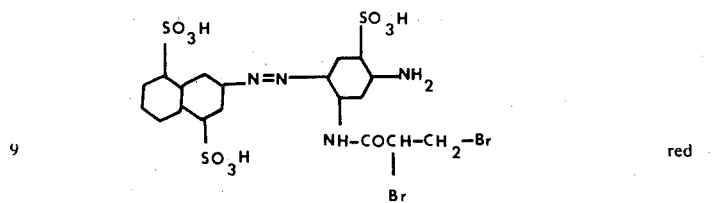 | red |
Dyestuffs that dye cellulosic materials the shades listed in Column II of the following Table may be obtained by coupling the diazo compounds of the amines listed in Column I with 4-methyl-2,6-dihydroxy-3-cyanopyridine. Pc indicates the phthalocyanine residue.

| | I | II |
|---|---|---|
| 1 | 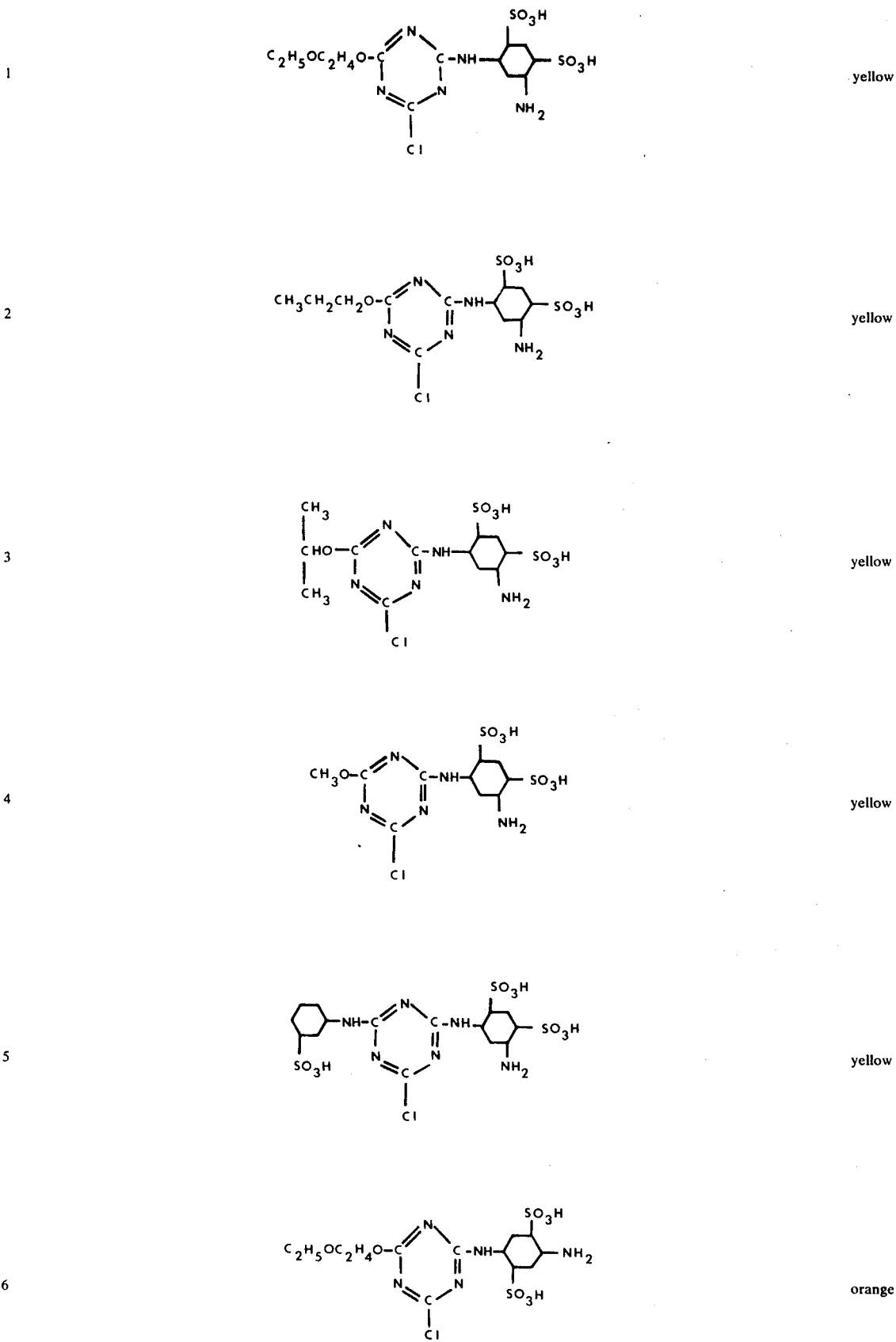 | yellow |
| 2 | | yellow |
| 3 | | yellow |
| 4 | | yellow |
| 5 | | yellow |
| 6 | | orange |

-continued
| | I | II |
|---|---|---|
| 7 | 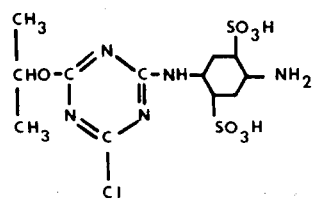 | orange |
| 8 | 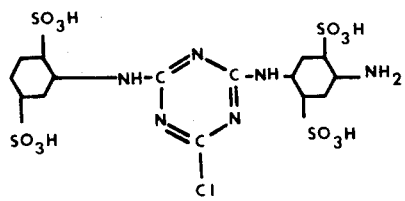 | orange |
| 9 | 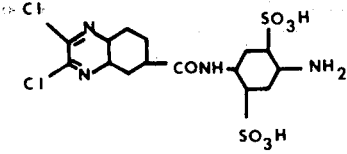 | orange |
| 10 | 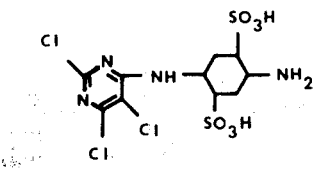 | orange |
| 11 | 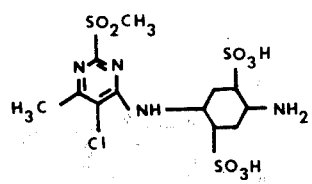 | orange |

| | I | II |
|---|---|---|
| 12 | 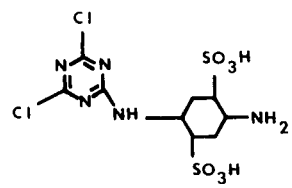 | orange |
| 13 | 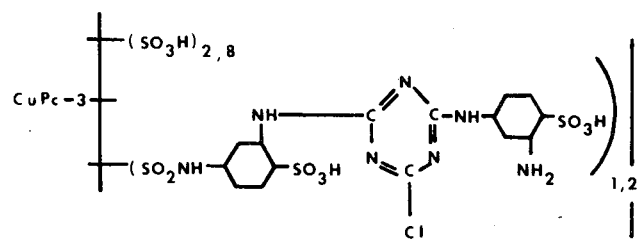 | green |
| 14 | 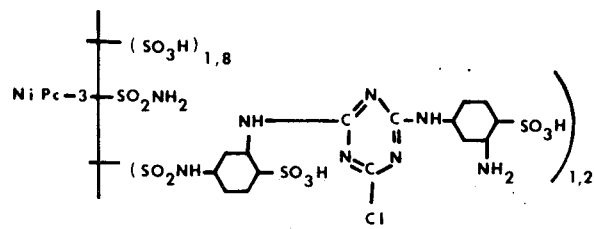 | green |
| 15 | 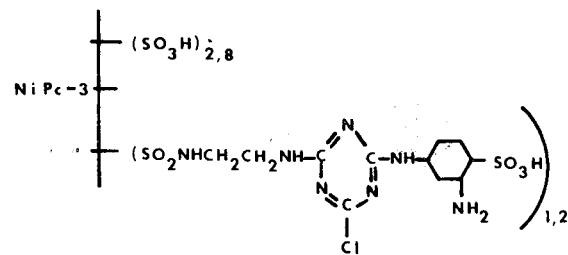 | green |
| 16 | 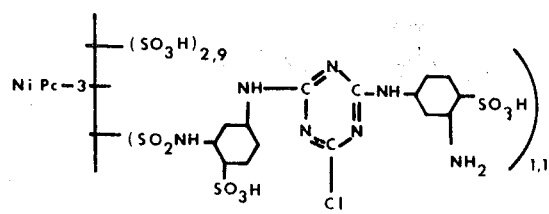 | green |

| I | II |
|---|---|
| 17 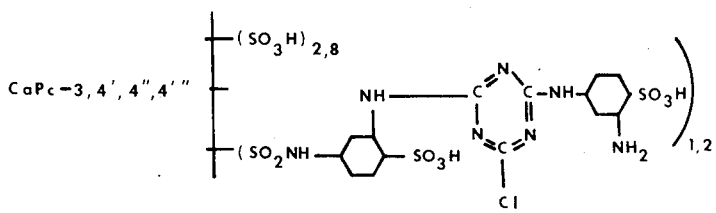 | green |
| 18 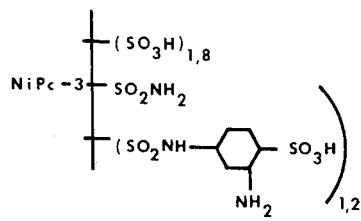 | green on wool and polyamide fibres |

EXAMPLE 5

48.9 Parts of the compound of the formula

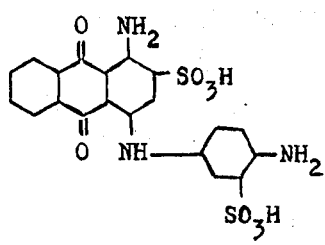

are dissolved neutral in 500 parts of water in the presence of sodium hydroxide. 57.7 Parts of the dyestuff of the formula

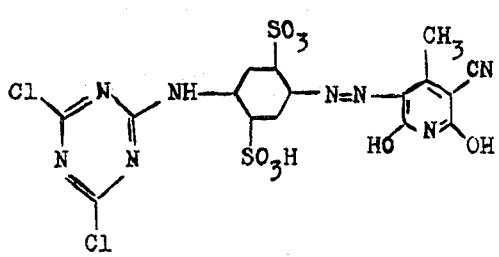

are added, which has been dissolved neutral in 1,200 parts of water in the presence of sodium hydroxide. The combined solutions are heated to 50° to 70°C while stirring. Dilute sodium hydroxide solution is then allowed to run in in a manner such that a pH of 6 to 7 is maintained. After condensation, the new dyestuff of the formula

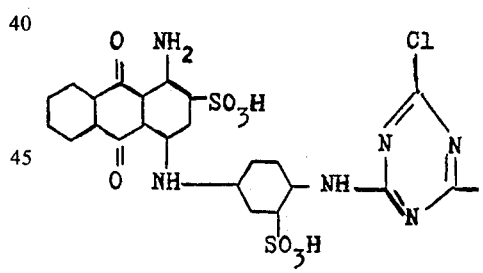

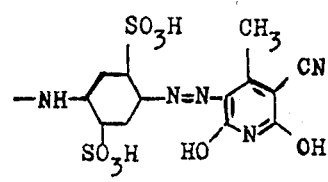

so formed is completely precipitated by the addition of sodium chloride, isolated by filtration and dried in vacuo. It dyes cellulosic fibres an olive-green shade fast to light and wet treatments.

The azo dyestuff used in this Example is manufactured in a manner analogous to that described in Example 4 by diazotization of monocyanurated 1,4-phenylene-diamine-2,5-disulphonic acid and subsequent coupling with 4-methyl-2,6-dihydroxy-3-cyanopyridine.

The dyestuff of the formula

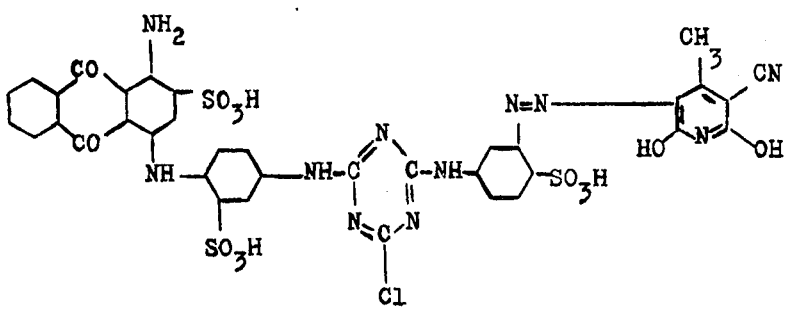

produced in accordance with Example 5 by condensation of 1-amino-4-(4'-aminophenylamino)-anthraquinone-2,2'-disulphonic acid with 4,6-dichloro-2-[3-(4-methyl-2,6-dihydroxy-3-cyanopyridin-(5)-ylazo)-4-sulphophenylamino]-1,3,5-triazine dyes cotton a yellowish green shade possessing good properties of fastness.

We claim:

1. A water soluble dyestuff of the formula

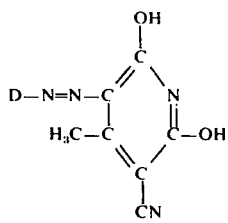

wherein D is phenyl which is substituted by at least one sulphonic acid group imparting solubility in water, and is additionally substituted by a fiber-reactive substituent attached to the diazo component via an -NH- group and selected from the group consisting of acryloxy, α-bromoacryloyl, α-chloroacryloyl, chloro- or bromo-triazinyl, chloro- or bromo-pyrimidyl, chloro- or bromo-propionyl, α,β-dibromopropionyl, fluorocyclobutanecarbonyl, chloroquinoxalinecarbonyl, methanesulphonylpyrimidinyl and a group of the formula

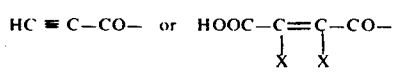

in which one of the symbols X represents hydrogen and the other chlorine or bromine; and said phenyl is further unsubstituted or substituted by at least one member selected from the group consisting of hydroxy, cyano, 4-methyl-3-sulfophenylsulfonyl, sulphamide, nitro, chloro, methoxy and acetylamino.

2. The dyestuff as claimed in claim 1 of the formula

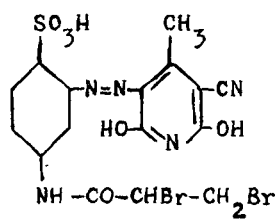

3. The dyestuff as claimed in claim 1 of the formula

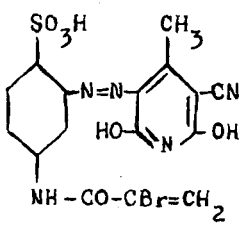

4. The dyestuff as claimed in claim 1 of the formula

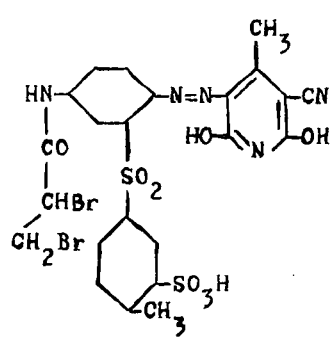

* * * * *